US011390275B2

(12) United States Patent
Ueda et al.

(10) Patent No.: US 11,390,275 B2
(45) Date of Patent: Jul. 19, 2022

(54) VEHICLE CONTROL DEVICE, VEHICLE CONTROL METHOD, AND PROGRAM

(71) Applicant: HONDA MOTOR CO., LTD., Tokyo (JP)

(72) Inventors: Yugo Ueda, Wako (JP); Akihiro Toda, Wako (JP); Katsuaki Sasaki, Wako (JP); Yuki Motegi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 159 days.

(21) Appl. No.: 16/647,538

(22) PCT Filed: Sep. 29, 2017

(86) PCT No.: PCT/JP2017/035476
§ 371 (c)(1),
(2) Date: Mar. 16, 2020

(87) PCT Pub. No.: WO2019/064490
PCT Pub. Date: Apr. 4, 2019

(65) Prior Publication Data
US 2020/0231144 A1 Jul. 23, 2020

(51) Int. Cl.
B60W 30/09 (2012.01)
B60W 50/14 (2020.01)

(52) U.S. Cl.
CPC ............ B60W 30/09 (2013.01); B60W 50/14 (2013.01); B60W 2520/10 (2013.01); B60W 2554/4029 (2020.02); B60W 2554/80 (2020.02); B60W 2720/10 (2013.01)

(58) Field of Classification Search
CPC ................. B60W 30/09; B60W 50/14; B60W 2554/4029; B60W 2554/80; B60W 2520/10; B60W 2720/10
See application file for complete search history.

(56) References Cited

U.S. PATENT DOCUMENTS

2003/0146827 A1  8/2003  Koike
2015/0166062 A1* 6/2015  Johnson ............... B60W 10/20
                                                       701/41

FOREIGN PATENT DOCUMENTS

JP    2003-231450    8/2003
JP    2005-173909    6/2005
JP    2006-110207    4/2006
(Continued)

OTHER PUBLICATIONS

International Search Report and Written Opinion for International Application No. PCT/JP2017/035476 dated Nov. 28, 2017, 10 pages.
(Continued)

Primary Examiner — Michael D Lang
(74) Attorney, Agent, or Firm — Amin, Turocy & Watson, LLP

(57) ABSTRACT

A vehicle control device includes a pedestrian recognizer configured to recognize a pedestrian present in the periphery of a vehicle, and a driving controller configured to decelerate at least the vehicle irrespective of an occupant's operation of the vehicle in accordance with the vehicle and a pedestrian approaching each other, and delays a timing at which the vehicle is stopped in a case where a plurality of pedestrians recognized by the pedestrian recognizer are present on a traveling route of the vehicle.

17 Claims, 11 Drawing Sheets

(56) References Cited

FOREIGN PATENT DOCUMENTS

| | | |
|---|---|---|
| JP | 2007-251257 | 9/2007 |
| JP | 2009-202676 | 9/2009 |
| JP | 2015-024713 | 2/2015 |
| JP | 2017-004471 | 1/2017 |

OTHER PUBLICATIONS

Japanese Office Action for Japanese Patent Application No. 2019-544096 dated Oct. 27, 2020.

* cited by examiner

VEHICLE CONTROL DEVICE, VEHICLE CONTROL METHOD, AND PROGRAM

TECHNICAL FIELD

The present invention relates to a vehicle control device, a vehicle control method, and a program.

BACKGROUND ART

In recent years, there has been progress in research for automatic control of a vehicle. In connection with this, a technique for acquiring a future behavior in automated driving and notifying the outside of a vehicle of the acquired future behavior is known (see Patent Literature 1).

CITATION LIST

Patent Literature

[Patent Literature 1]
Japanese Unexamined Patent Application, First Publication No. 2017-4471

SUMMARY OF INVENTION

Technical Problem

However, in the related art, a notification based on a future behavior in automated driving of a vehicle is given to nearby pedestrians or other vehicles one-sidedly, and driving control for causing the vehicle to continue to travel on the basis of the states of nearby pedestrians or the like has not been considered.

The present invention was contrived in view of such circumstances, and one object thereof is to provide a vehicle control device, a vehicle control method, and a program that make it possible to perform driving control for continuing traveling of a vehicle on the basis of the state of a pedestrian present on a traveling route.

Solution to Problem (1) There is provided a vehicle control device (100) including: a pedestrian recognizer (132) configured to recognize a pedestrian present in the periphery of a vehicle; and a driving controller (142, 144, 160) configured to decelerate at least the vehicle irrespective of an occupant's operation of the vehicle in accordance with the vehicle and a pedestrian approaching each other, and delays a timing at which the vehicle is stopped in a case where a plurality of pedestrians recognized by the pedestrian recognizer are present on a traveling route of the vehicle.

(2) In (1), in a case where a plurality of pedestrians recognized by the pedestrian recognizer are present on the traveling route of the vehicle, the driving controller causes the vehicle to travel so as to follow a pedestrian who advances in the same direction as a traveling direction of the vehicle and is closest to the vehicle among the plurality of pedestrians.

(3) In (1) or (2), the vehicle control device further includes: a projector (70) configured to project an image onto a road; and a projection controller (180) configured to cause the projector to project an image indicating a future trajectory of the vehicle in a case where a plurality of pedestrians recognized by the pedestrian recognizer are present on the traveling route of the vehicle.

(4) In (3), the projection controller changes a range in which the image is projected by the projector on the basis of a speed of the vehicle.

(5) In any one of (1) to (4), in a case where a plurality of pedestrians recognized by the pedestrian recognizer are present, the driving controller delays a timing at which the vehicle is stopped by narrowing a range in which the pedestrians are specified as control targets.

(6) In any one of (1) to (5), the driving controller delays a timing at which the vehicle is stopped by lowering a threshold at which the vehicle is stopped.

(7) In any one of (1) to (6), the vehicle control device further includes a gap recognizer (136) configured to recognize a position of a gap on a road on which the vehicle travels from positions of a plurality of pedestrians recognized by the pedestrian recognizer, and the driving controller generates a future target trajectory along which the vehicle will travel on the basis of a region of the gap recognized by the gap recognizer, and the vehicle travels along the generated target trajectory.

(8) In any one of (1) to (7), the pedestrian recognizer recognizes a specific pedestrian who leads the recognized plurality of pedestrians, and the driving controller performs deceleration control on the vehicle on the basis of the specific pedestrian's behavior.

(9) There is provided a vehicle control method including: causing a pedestrian recognizer to recognize a pedestrian present in the periphery of a vehicle; and causing a driving controller to decelerate at least the vehicle irrespective of an occupant's operation of the vehicle in accordance with the vehicle and a pedestrian approaching each other, and delay a timing at which the vehicle is stopped in a case where a plurality of pedestrians recognized by the pedestrian recognizer are present on a traveling route of the vehicle.

(10) There is provided a non-transitory computer-readable storage medium that stores a program to be executed by a vehicle computer to perform at least: recognize a pedestrian present in the periphery of a vehicle to: decelerate at least the vehicle irrespective of an occupant's operation of the vehicle in accordance with the vehicle and a pedestrian approaching each other; and delay a timing at which the vehicle is stopped in a case where a plurality of pedestrians recognized by the pedestrian recognizer are present on a traveling route of the vehicle.

Advantageous Effects of Invention

According to (1) to (10), it is possible to perform driving control for causing a vehicle to continue to travel on the basis of the states of pedestrians present on a traveling route.

DESCRIPTION OF EMBODIMENTS

Hereinafter, an embodiment of a vehicle control device, a vehicle control method, and a program of the present invention will be described with reference to the accompanying drawings. Meanwhile, in the following description, an automated driving vehicle is used. The term "automated driving" refers to controlling one or both of the steering and speed of a vehicle irrespective of an occupant's operation and causing the vehicle to travel. In addition, the automated driving vehicle may allow an occupant's manual driving to be performed. In manual driving, a traveling driving force output device, a brake device, and a steering device of a vehicle to be described later are controlled in accordance with the amount of operation of a driving operator to be described later.

[Overall Configuration]

Figure 1:
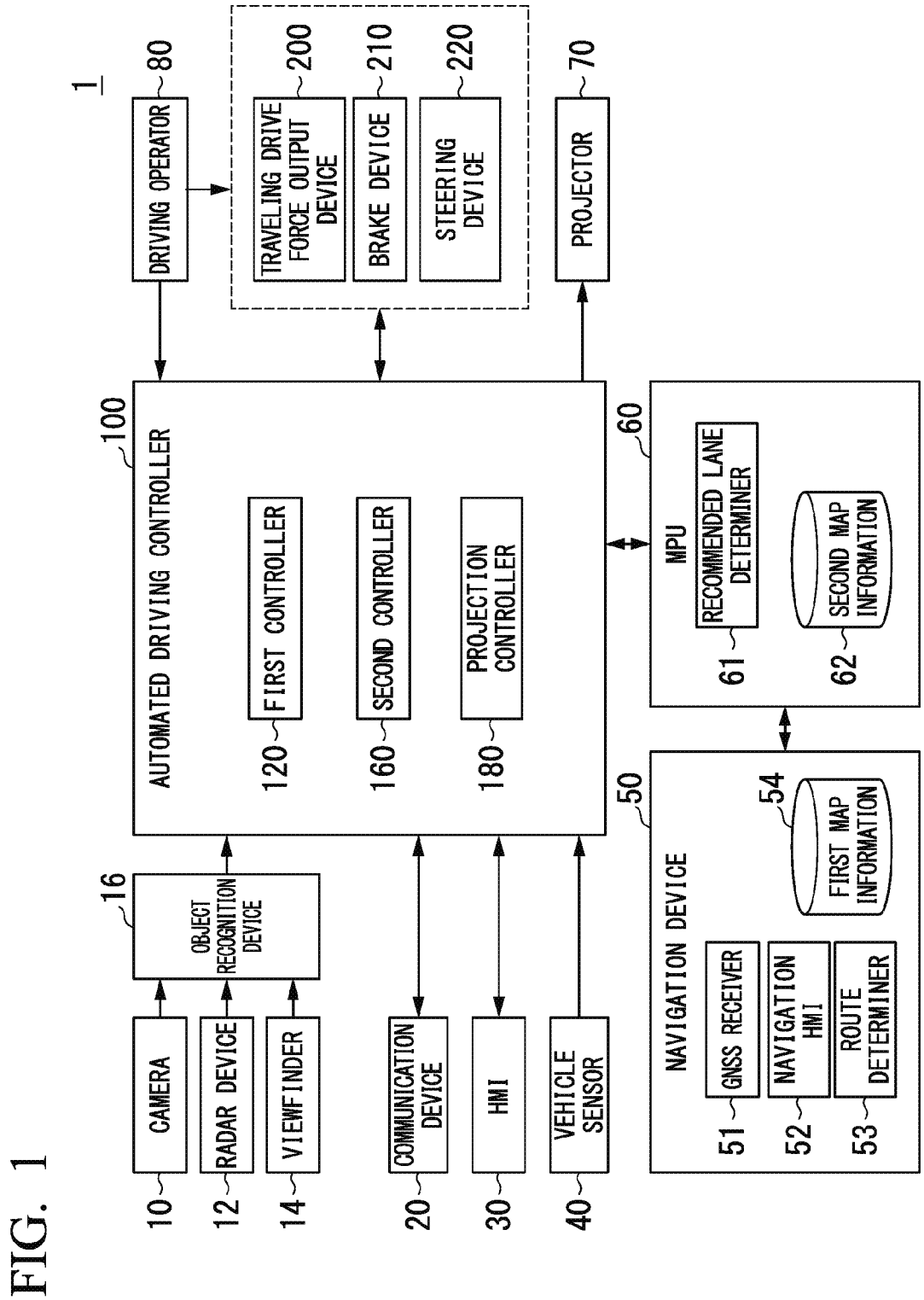
FIG. 1 is a configuration diagram of a vehicle system 1 using a vehicle control device according to an embodiment.

FIG. 1 is a configuration diagram of a vehicle system 1 using a vehicle control device according to an embodiment. A vehicle having the vehicle system 1 mounted therein is, for example, a two-wheeled, three-wheeled, or four-wheeled vehicle or the like, and the driving source thereof is an internal-combustion engine such as a diesel engine or a gasoline engine, an electric motor, or a combination thereof. In a case where an electric motor is included, the electric motor operates using power generated by a generator connected to an internal-combustion engine or discharging power of a secondary battery or a fuel cell.

The vehicle system 1 includes, for example, a camera 10, a radar device 12, a viewfinder 14, an object recognition device 16, a communication device 20, a human machine interface (HMI) 30, a vehicle sensor 40, a navigation device 50, a map positioning unit (MPU) 60, a projector 70, a driving operator 80, an automated driving controller (an example of a vehicle control device) 100, a traveling drive force output device 200, a brake device 210, and a steering device 220. These devices or instruments are connected to each other through a multiplex communication line such as a controller area network (CAN) communication line, a serial communication line, a wireless communication network, or the like. Meanwhile, the configuration shown in FIG. 1 is merely an example, and some portions of the configuration may be omitted, or other configurations may be further added.

The camera 10 is a digital camera using a solid-state imaging element such as, for example, a charge coupled device (CCD) or a complementary metal oxide semiconductor (CMOS). One or a plurality of cameras 10 are installed at any points on a vehicle having the vehicle system 1 mounted therein (hereinafter referred to as a host vehicle M). In a case where a forward image is captured, the camera 10 is installed on the upper portion of the front windshield, the rear surface of the rear-view mirror, or the like. The camera 10, for example, repeatedly captures an image of the vicinity of the host vehicle M periodically. The camera 10 may be a stereo camera.

The radar device 12 radiates radio waves such as millimeter waves to the vicinity of the host vehicle M, and detects radio waves (reflected waves) reflected from an object to detect at least the position (distance to and orientation of) of the object. One or a plurality of radar devices 12 are installed at any points on the host vehicle M. The radar device 12 may detect the position and speed of an object with a frequency modulated continuous wave (FM-CW) system.

The viewfinder 14 is a light detection and ranging (LIDAR) viewfinder. The viewfinder 14 irradiates the vicinity of the host vehicle M with light, and measures scattered light. The viewfinder 14 detects a distance to an object on the basis of a time from light emission to light reception. The irradiation light is, for example, pulsed laser light. One or a plurality of viewfinders 14 are installed at any points on the host vehicle M.

The object recognition device 16 recognizes the position, type, speed, or the like of an object by performing a sensor fusion process on the results of detection performed by some or all of the camera 10, the radar device 12, and the viewfinder 14. The object recognition device 16 outputs a recognition result to the automated driving controller 100. In addition, the object recognition device 16 may output, as necessary, the detection results of the camera 10, the radar device 12, and the viewfinder 14, as there are, to the automated driving controller 100.

The communication device 20 communicates another vehicle which is present in the vicinity of the host vehicle M using, for example, a cellular network, a Wi-Fi network, Bluetooth (registered trademark), dedicated short range communication (DSRC), or the like, or communicates with server devices of various types through a wireless base station.

The HMI 30 presents various types of information to an occupant of the host vehicle M, and accepts the occupant's input operation. The HMI 30 includes various display devices, a speaker, a buzzer, a touch panel, a switch (for example, a hazard switch), a key, and the like.

The vehicle sensor 40 includes a vehicle speed sensor that detects the speed of the host vehicle M, an acceleration sensor that detects an acceleration, a yaw rate sensor that detects an angular velocity around a vertical axis, an orientation sensor that detects the direction of the host vehicle M, or the like.

The navigation device 50 includes, for example, a global navigation satellite system (GNSS) receiver 51, a navigation HMI 52, and a route determiner 53, and has first map information 54 held in a storage device such as a hard disk drive (HDD) or a flash memory. The GNSS receiver 51 specifies the position of the host vehicle M on the basis of a signal received from a GNSS satellite. The position of the host vehicle M may be specified or complemented by an inertial navigation system (INS) in which an output of the vehicle sensor 40 is used. The navigation HMI 52 includes a display device, a speaker, a touch panel, a key, and the like. A portion or the entirety of the navigation HMI 52 may be shared with the above-described the HMI 30. The route determiner 53 determines, for example, a route (hereinafter, a route on a map) from the position (or any input position)

of the host vehicle M specified by the GNSS receiver 51 to a destination input by an occupant using the navigation HMI 52 with reference to the first map information 54. The first map information 54 is, for example, information in which a road shape is represented by a link indicating a road and nodes connected by the link. The first map information 54 may include the curvature of a road, point of interest (POI) information, or the like. The route on a map determined by the route determiner 53 is output to the MPU 60. In addition, the navigation device 50 may perform route guidance using the navigation HMI 52 on the basis of the route on a map determined by the route determiner 53. Meanwhile, the navigation device 50 may be realized by the function of a terminal device such as, for example, a smartphone or a tablet terminal possessed by an occupant. In addition, the navigation device 50 may transmit its current position and destination to a navigation server through the communication device 20, and acquire a route on a map sent back from the navigation server.

The MPU 60 functions as, for example, a recommended lane determiner 61, and holds second map information 62 in a storage device such as an HDD or a flash memory. The recommended lane determiner 61 divides a route provided from the navigation device 50 into a plurality of blocks (for example, divides a route every 100 [m] in a vehicle traveling direction), and refers to the second map information 62 to determine a recommended lane for each block. The recommended lane determiner 61 determines the number of lane from the left in which a vehicle travels. In a case where a divergence point, a merging point or the like is present in a route, the recommended lane determiner 61 determines a recommended lane so that the host vehicle M can travel along a reasonable route for advancing to a branch destination.

The second map information 62 is map information higher in accuracy than the first map information 54. The second map information 62 includes, for example, information of the center of a lane, information of the boundary of a lane, or the like. In addition, the second map information 62 may contain road information, traffic regulation information, address information (an address or a postal code), facility information, telephone number information, or the like. The second map information 62 may be updated when necessary by accessing another device using the communication device 20.

The projector 70 is, for example, a projector. The projector 70 projects an image onto a traveling route of the host vehicle M at a timing indicated by a projection controller 180. The details of an image which is projected by the projector 70 will be described later.

The driving operator 80 includes, for example, an accelerator pedal, a brake pedal, a shift lever, a steering wheel, a variant steering wheel, a joystick, and other operators. A sensor that detects the amount of operation or the presence or absence of operation is installed on the driving operator 80, and the detection results are output to the automated driving controller 100, or one or both of the traveling driving force output device 200, the brake device 210, and the steering device 220.

The automated driving controller 100 includes, for example, a first controller 120, a second controller 160, and the projection controller 180. The first controller 120, the second controller 160, and the projection controller 180 are realized by a hardware processor such as, for example, a central processing unit (CPU) executing a program (software). In addition, some or all of these components may be realized by hardware (circuit unit; including circuitry) such as a large scale integration (LSI), an application specific integrated circuit (ASIC), a field-programmable gate array (FPGA), or a graphics processing unit (GPU), and may be realized by software and hardware in cooperation.

Figure 2:
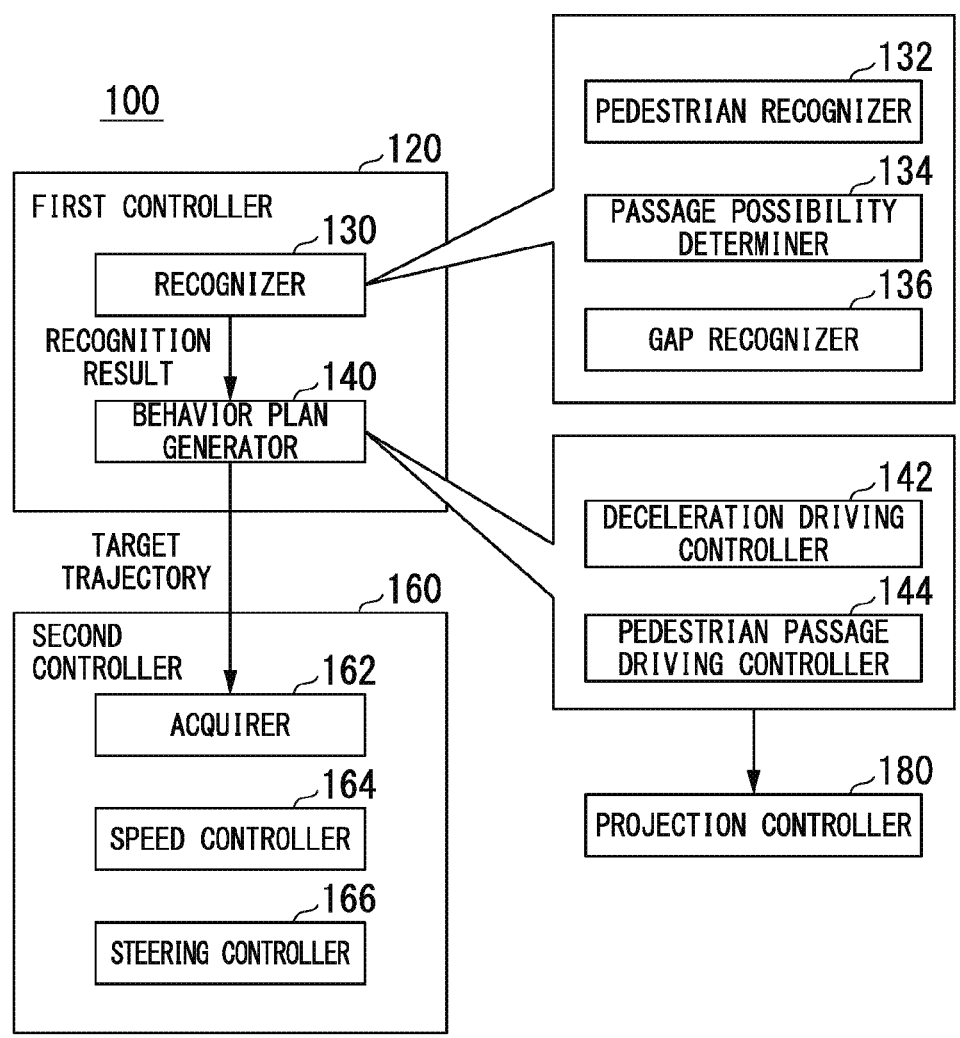
FIG. 2 is a functional configuration diagram of a first controller 120, a second controller 160, and a projection controller 180.

FIG. 2 is a functional configuration diagram of the first controller 120, the second controller 160, and the projection controller 180. The first controller 120 includes, for example, a recognizer 130 and a behavior plan generator 140. The recognizer 130 includes, for example, a pedestrian recognizer 132, a passage possibility determiner 134, and a gap recognizer 136. The behavior plan generator 140 includes, for example, a deceleration driving controller 142 and a pedestrian passage driving controller 144. A combination of the passage possibility determiner 134, the deceleration driving controller 142, the pedestrian passage driving controller 144, and the second controller 160 are an example of a "driving controller."

The first controller 120 concurrently realizes, for example, a function based on artificial intelligence (AI) and a function based on a model imparted in advance. For example, a function of "recognizing a point of intersection" may be realized by the recognition of a point of intersection based on an image recognition method using deep learning or the like and recognition based on conditions (such as a signal or a road sign on which pattern matching is possible) imparted in advance being concurrently executed, and being comprehensively evaluated by performing scoring on both. Thereby, the reliability of automated driving is secured.

The recognizer 130 recognizes the position and speed of an object near the host vehicle M, and the state of acceleration or the like on the basis of information which is input from the camera 10, the radar device 12, and the viewfinder 14 through the object recognition device 16. The object includes an opposing vehicle or a stationary obstacle. The position of the object is recognized as, for example, a position in absolute coordinates with a representative point (such as the centroid or the center of a drive shaft) of the host vehicle M as an origin, and is used in control. The position of the object may be represented by a representative point such as the centroid or a corner of the object, or may be represented by a representative region. The "state" of the object may include the acceleration or jerk of the object, or a "behavior state" (for example, whether it is performing or attempting to perform a lane change). In addition, the recognizer 130 recognizes the shape of a curve on which the host vehicle M passes henceforth on the basis of an image captured by the camera 10. The recognizer 130 converts the shape of a curve to an actual plane from the image captured by the camera 10, and outputs, for example, two-dimensional point sequence information or information represented using a model equal to this, as information indicating the shape of a curve, to the behavior plan generator 140.

In addition, the recognizer 130 recognizes a lane (traveling lane) in which the host vehicle M is traveling. For example, the recognizer 130 recognizes a traveling lane by comparing a pattern of a road partition line (for example, an array of solid lines and broken lines) obtained from the second map information 62 with a pattern of a road partition line located in the vicinity of the host vehicle M which is recognized from an image captured by the camera 10. Meanwhile, the recognizer 130 is not limited to the road partition line, and may recognize the traveling lane by recognizing a driving boundary (road boundary) including a road partition line, a shoulder, a curbstone, a median strip, a guardrail, or the like. In this recognition, the position of the host vehicle M acquired from the navigation device 50 or processing results based on an INS may be added. In addition, the recognizer 130 recognizes a stop line, a road sign, a red signal, a tollbooth, and other road events.

Upon recognizing a traveling lane, the recognizer 130 recognizes the position or posture of the host vehicle M with respect to the traveling lane. The recognizer 130 may recognize, for example, deviation of the host vehicle M from the center of the lane which is a reference point, and an angle formed with respect to a line aligned with the center of the lane of the host vehicle M in its traveling direction, as the relative position and posture of the host vehicle M with respect to the traveling lane. Instead, the recognizer 130 may recognize the position of the reference point of the host vehicle M or the like with respect to either lateral end portion (a road partition line or a road boundary) of the traveling lane, as the relative position of the host vehicle M with respect to the traveling lane.

In addition, the recognizer 130 may derive the accuracy of recognition in the above recognition process, and output the derived accuracy as recognition accuracy information to the behavior plan generator 140. For example, the recognizer 130 generates recognition accuracy information on the basis of a frequency at which a road partition line can be recognized in a fixed period. The functions of the pedestrian recognizer 132, the passage possibility determiner 134, and the gap recognizer 136 of the recognizer 130 will be described later.

The behavior plan generator 140 generates a target trajectory along which the host vehicle M will travel in the future so that the host vehicle travels in a recommended lane determined by the recommended lane determiner 61 in principle and automated driving coping with the peripheral situation of the host vehicle M is executed. The target trajectory includes, for example, a speed element. For example, the target trajectory may be represented as a trajectory obtained by arranging points (trajectory points) at which the host vehicle M will arrive in order. The functions of the deceleration driving controller 142 and the pedestrian passage driving controller 144 of the behavior plan generator 140 will be described later.

The second controller 160 controls the traveling driving force output device 200, the brake device 210, and the steering device 220 so that the host vehicle M passes along the target trajectory generated by the behavior plan generator 140 according to scheduled times.

Referring back to FIG. 2, the second controller 160 includes, for example, an acquirer 162, a speed controller 164, and a steering controller 166. The acquirer 162 acquires information of target trajectory (trajectory point) generated by the behavior plan generator 140, and stores the acquired information in a memory (not shown). The speed controller 164 controls the traveling driving force output device 200 or the brake device 210 on the basis of a speed element associated with the target trajectory stored in the memory. The steering controller 166 controls the steering device 220 in accordance with the bent state of the target trajectory stored in the memory. The processes of the speed controller 164 and the steering controller 166 are realized by, for example, a combination of feedforward control and feedback control. As an example, the steering controller 166 executes a combination of feedforward control according to the curvature of a road in front of the host vehicle M and feedback control based on deviation from the target trajectory.

The projection controller 180 causes the projector 70 to project an image, indicating a target trajectory generated by the behavior plan generator 140, the deceleration driving controller 142, or the pedestrian passage driving controller 144 along which the host vehicle M will travel in the future, onto the traveling road surface of the host vehicle M. The details of the function of the projection controller 180 will be described later.

The traveling driving force output device 200 outputs a traveling driving force (torque) for a vehicle to travel to a driving wheel. The traveling driving force output device 200 includes, for example, a combination of an internal-combustion engine, an electric motor, a transmission or the like, and an ECU that controls these components. The ECU controls the above components in accordance with information which is input from the second controller 160 or information which is input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor in accordance with the information which is input from the second controller 160 or the information which is input from the driving operator 80, and causes a brake torque according to a braking operation to be output to each wheel. The brake device 210 may include a mechanism that transfers hydraulic pressure generated by the operation of a brake pedal included in the driving operator 80 through a master cylinder to the cylinder as a backup. Meanwhile, the brake device 210 is not limited to the above-described configuration, and may be an electronic control type hydraulic brake device that controls an actuator in accordance with the information which is input from the second controller 160 and transfers hydraulic pressure of the master cylinder to the cylinder.

The steering device 220 includes, for example, a steering ECU and an electric motor. The electric motor changes the direction of a turning wheel, for example, by causing a force to act on a rack and pinion mechanism. The steering ECU drives the electric motor in accordance with the information which is input from the second controller 160 or the information which is input from the driving operator 80, and changes the direction of the turning wheel.

[Function of Pedestrian Recognizer]

The pedestrian recognizer 132 recognizes pedestrians who are present in the periphery of the host vehicle M. In the present embodiment, control aimed at pedestrians detected on a road having a particularly small width or a road having a high possibility of pedestrians walking on the road is performed.

The pedestrian recognizer 132 recognizes, for example, pedestrians present in the traveling direction of the host vehicle M (hereinafter referred to as front). In addition, the pedestrian recognizer 132 recognizes pedestrians present in front of the host vehicle M and on its traveling route. The term "traveling route" refers to a region in which the host vehicle M can travel. A sidewalk partitioned as a roadway by a step difference, a guardrail, or the like may be assumed not to be included in the traveling route. In addition, the pedestrian recognizer 132 recognizes the position, movement speed, and movement direction of each pedestrian.

In addition, in a case where the number of pedestrians present on a traveling route on which the host vehicle M travels is equal to or greater than a first predetermined value (for example, five [persons]), the pedestrian recognizer 132 keeps a range in which pedestrians are recognized (a sensing range) as it is, but may narrow a range which is a target for control such as deceleration driving control to reduce the number of pedestrians for whom control is performed. The range which is a target for control in that case is set using, for example, the angle of view of the camera 10 as a limit.

Figure 3:
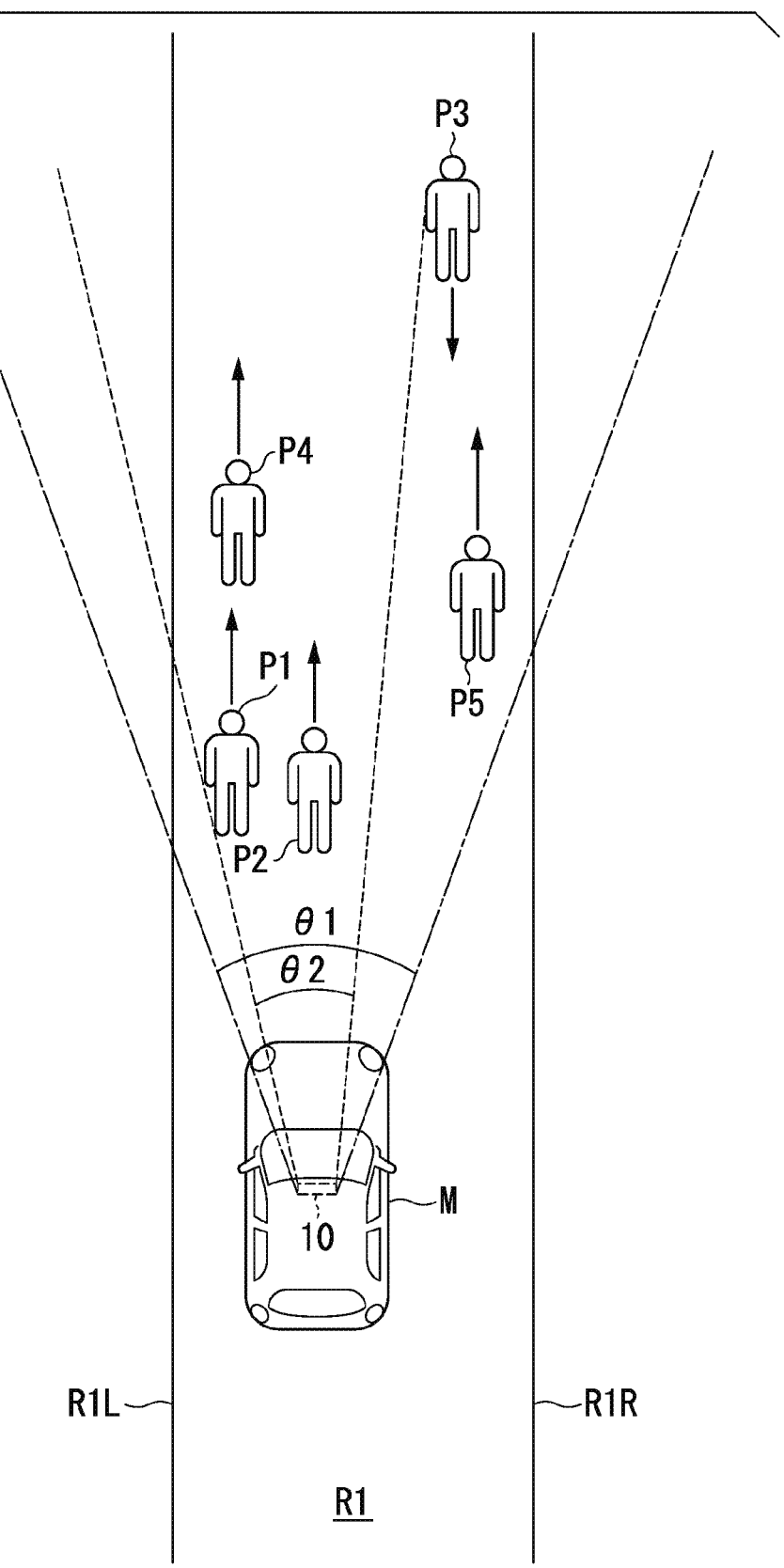
FIG. 3 is a diagram illustrating narrowing of a range of recognition of pedestrians performed by a pedestrian recognizer 132.

FIG. 3 is a diagram illustrating narrowing of a range which is a target for control. In the example of FIG. 3, an angle θ1 represents a range which is a control target before a range which is a target for control is narrowed. The range which is a control target in this case is the same range as a sensing range. In a case where pedestrians are recognized in this range, the pedestrian recognizer 132 recognizes pedestrians P1 to P5. Since the number of recognized pedestrians is equal to or greater than the first predetermined value, the pedestrian recognizer 132 makes a range which is a target for control narrower than the angle θ1.

An angle θ2 represents a range when a sensing range is kept as it is and a range which is a target for control is narrowed. The pedestrian recognizer 132 sets the pedestrians P1, P2, and P4 included in the range of the angle θ2 as pedestrians for whom control is performed. Meanwhile, in a case where the number of pedestrians for whom control is performed when the range is narrowed is equal to or greater than the first predetermined value, the pedestrian recognizer 132 may further narrow a range which is a target for control to recognize pedestrians.

In addition, in a case where the number of recognized pedestrians is equal to or greater than the first predetermined value, the pedestrian recognizer 132 may limit pedestrians to a second predetermined value (for example, two [persons]) in increasing order of distance from the host vehicle M instead of narrowing a range which is a target for control, and recognize the positions, movement speeds, and movement directions of the pedestrians. In addition, in a case where the number of recognized pedestrians is equal to or greater than the first predetermined value, the pedestrian recognizer 132 may limit pedestrians in increasing order of distance from the host vehicle M along with narrowing a range which is a target for control, and recognize the positions, movement speeds, and movement directions of the pedestrians.

In this manner, the number of pedestrians for whom control is performed is limited by narrowing a range which is a target for control, whereby it is possible to limit pedestrians who are targets for performing driving control in a case where there are a large number of pedestrians on a road, for example, such as tourists who act as a group, students going to school, and the like. Therefore, the automated driving controller 100 can reduce a burden of a recognition process or driving control. In addition, the automated driving controller 100 performs control or the like for avoiding contact with pedestrians included in a range which is a control target, an thus can cause the host vehicle M to continue to travel in a slow-moving state without stopping the host vehicle M due to the influence of other pedestrians having a low possibility of contact with the host vehicle. Therefore, it is possible to delay a timing of stop caused by the deceleration of the host vehicle M.

[Function of Passage Possibility Determiner]

The passage possibility determiner 134 determines whether the host vehicle M can pass beside pedestrians on the basis of the positions of pedestrians recognized by the pedestrian recognizer 132, the host vehicle M, the shape or size of its traveling route, and the like.

Figure 4:
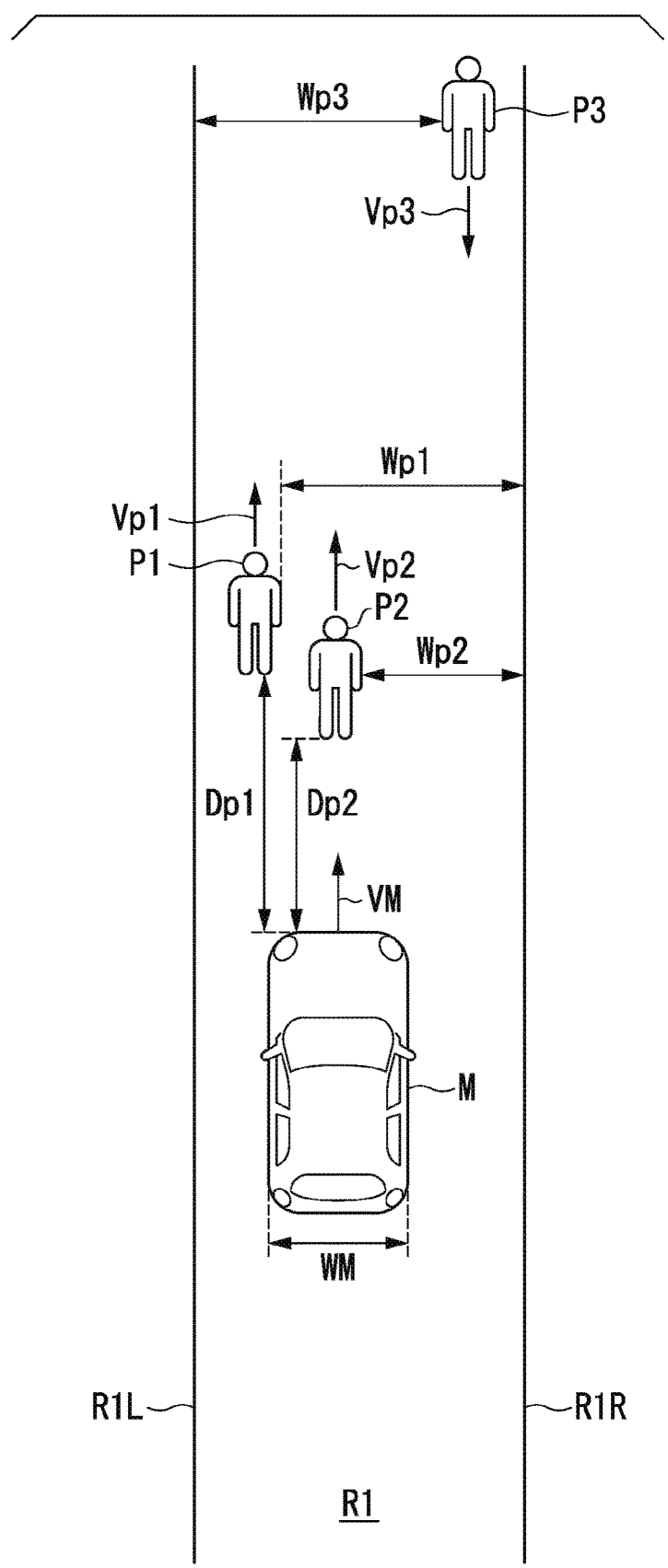
FIG. 4 is a diagram illustrating processing of a passage possibility determiner 134.

FIG. 4 is a diagram illustrating processing of the passage possibility determiner 134. In the example of FIG. 4, pedestrians P1 to P3 are present on a traveling route R1 on which the host vehicle M travels. It is assumed that the host vehicle M travels in its traveling direction at a speed VM, and that the pedestrians P1 to P3 move in directions shown by arrows at their respective speeds Vp1 to Vp3.

The passage possibility determiner 134 calculates a width from the position of each of the pedestrians P1 to P3 to a left end R1L of the traveling route R1 and a width therefrom to a right end RIR in the width direction of the traveling route R1, and acquires widths Wp1 to Wp3 which are the larger of the calculated widths. The passage possibility determiner 134 compares each of the widths Wp1 to Wp3 with a vehicle width WM of the host vehicle M, and determines that the host vehicle M cannot pass beside the pedestrians in a case where at least one of the widths Wp1 to Wp3 is equal to or less than the vehicle width WM.

In the example of FIG. 4, since the distance Wp2 from the right end RIR is smaller than the vehicle width WM with respect to the pedestrian P2, the passage possibility determiner 134 determines that the host vehicle cannot pass on the right side. Here, in a case where the host vehicle M cannot pass beside the pedestrian P2 because the pedestrian P2 is present at a position closest to the host vehicle M, the host vehicle likewise cannot pass beside the pedestrians P1 and P3 present further ahead. Therefore, in a case where it is determined that the host vehicle cannot pass beside the pedestrian P2 closest to the host vehicle M among a plurality of pedestrians recognized by the pedestrian recognizer 132, the passage possibility determiner 134 may determine that the host vehicle cannot pass beside the pedestrians P1 to P3 inclusive of the pedestrians P1 and P3 present further ahead.

[Function of Deceleration Driving Controller]

In a case where it is determined by the passage possibility determiner 134 that the host vehicle M cannot pass beside the recognized pedestrian P, the deceleration driving controller 142 decelerates at least the host vehicle M irrespective of an occupant's operation of the host vehicle M in accordance with the host vehicle M and a pedestrian approaching each other. This deceleration control is realized by the second controller 160 executing driving control on the basis of a target trajectory generated by the deceleration driving controller 142. However, in a case where it is determined by the passage possibility determiner 134 that the host vehicle M cannot pass beside the recognized pedestrian P, and a plurality of pedestrians recognized by the pedestrian recognizer 132 are present on the traveling route of the host vehicle M, the deceleration driving controller 142 delays a timing at which the host vehicle M is stopped (that is, stopping of the host vehicle M is suppressed).

In the example of FIG. 4, the pedestrian recognizer 132 recognizes the three pedestrians P1 to P3. Therefore, the deceleration driving controller 142 further delays a timing at which the host vehicle M is stopped in that case than a timing at which the host vehicle M is stopped in a case where one pedestrian is present.

Figure 5:
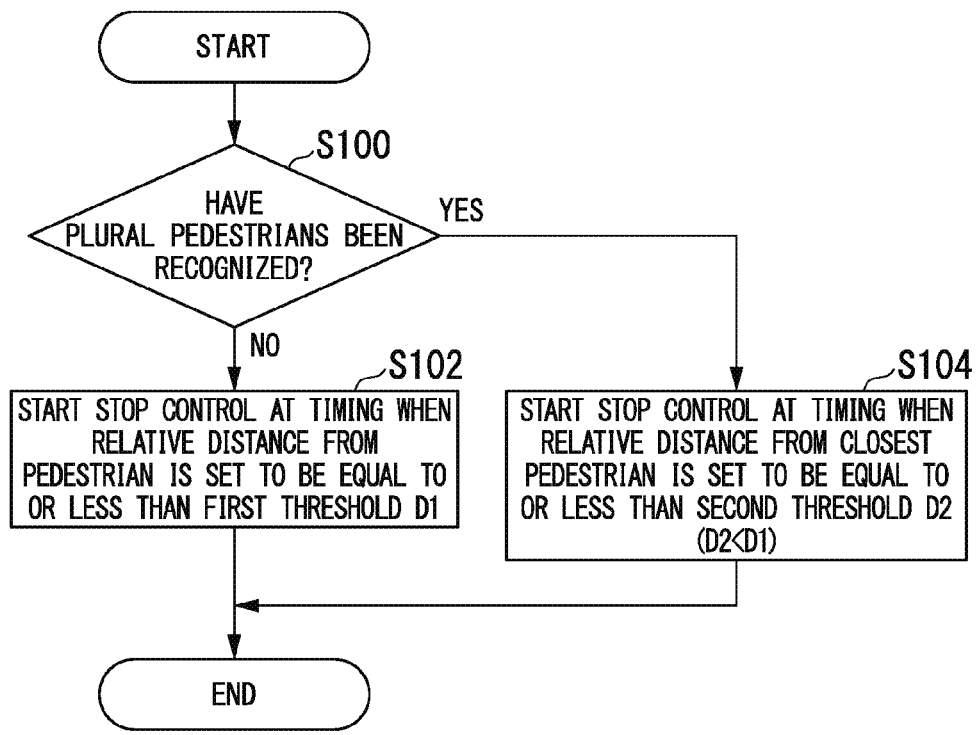
FIG. 5 is a flow chart illustrating an example of a start process of deceleration driving by a deceleration driving controller 142.

FIG. 5 is a flow chart illustrating an example of a start process of deceleration driving by the deceleration driving controller 142. In the example of FIG. 5, the deceleration driving controller 142 determines whether a plurality of pedestrians have been recognized by the pedestrian recognizer 132 (step S100). In a case where it is determined that a plurality of pedestrians have not been recognized (in a case where one pedestrian has been recognized), the deceleration driving controller 142 starts stop control of the host vehicle M at a timing when a relative distance between the host vehicle M and the pedestrian is set to be equal to or less than a first threshold D1 (step S102). In addition, in a case where it is determined that a plurality of pedestrians have been recognized in the process of S100, the deceleration driving controller 142 starts stop control of the host vehicle M at a timing when relative distances between the host vehicle M and the pedestrians are set to be equal to or less than a second threshold D2 smaller than the first threshold D1 (step S104). Thereby, it is possible to cause the host vehicle M to continue to travel until the host vehicle is located close to a pedestrian. In addition, when the host vehicle is controlled to be stopped at a too far distance in a case where a large number of pedestrians are present, pedestrians who are targets appear in succession, which leads to forcible stop over a long period of time. Therefore, pedestrians are caused to perceive the presence of the host vehicle M by performing slow approach, and thus it is possible to cause the pedestrians to move to the roadside of the traveling route R1.

In addition, in a case where it is determined by the passage possibility determiner 134 that the host vehicle cannot pass beside the pedestrians, the deceleration driving controller 142 may generate a target trajectory so as to follow a pedestrian who advances in the same direction as the traveling direction of the host vehicle M and is closest to the host vehicle M among a plurality of pedestrians recognized by the pedestrian recognizer 132.

In the example of FIG. 4, the pedestrian recognizer 132 recognizes the pedestrians P1 and P2 who move in the same direction as the traveling direction of the host vehicle M among the plurality of recognized pedestrians P1 to P3. In addition, the pedestrian recognizer 132 recognizes distances Dp1 and Dp2 between the host vehicle M and the pedestrians P1 and P2. The deceleration driving controller 142 changes the speed VM of the host vehicle M in accordance with the speed Vp2 of the pedestrian P2 present at the distance Dp2 shortest in distance from the host vehicle M out of the distances Dp1 and Dp2 recognized by the pedestrian recognizer 132. For example, the deceleration driving controller 142 changes the traveling speed VM of the host vehicle so that the traveling speed is equal to or less than the speed Vp2 of the pedestrian P2 and that a speed difference is within a predetermined speed (for example, approximately 3 [km/h]). Thereby, the deceleration driving controller 142 can cause the host vehicle M to continue to travel while maintaining a relative distance from the pedestrian P2 without catching up with the pedestrian P2. In addition, the deceleration driving controller 142 may change the traveling speed VM so as to gradually approach the pedestrian P2 in a range in which the host vehicle does not contact the pedestrian P2 on the basis of the speed Vp2 of the pedestrian. In addition, in a case where the host vehicle M follows a pedestrian who is moving in the same direction, an opposing pedestrian who has seen the vehicle is predicted to avoid the host vehicle M. As a result, the host vehicle M can continue to travel.

In addition, in a case where a relative distance from a pedestrian has become equal to or less than a threshold, the deceleration driving controller 142 may generate a target trajectory for stopping the host vehicle M. For example, in a case where a large number of pedestrians are assumed to be present on the traveling route R1, each of the pedestrians is predicted to walk in a predetermined speed range along a flow of walking of other pedestrians. Therefore, in a case where a large number of pedestrians are present on the traveling route R1, it is predicted that the possibility of coming into contact with the pedestrians does not increase even when the above-described threshold is reduced. Consequently, the deceleration driving controller 142 lowers the above-described threshold in accordance with the number of pedestrians recognized by the pedestrian recognizer 132.

Figure 6:
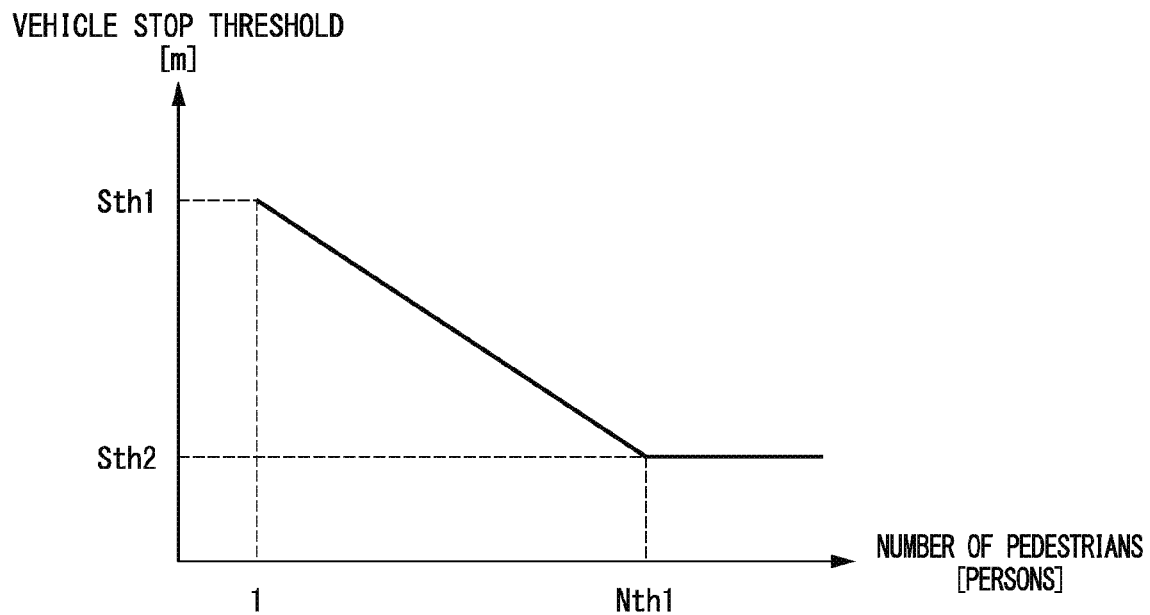
FIG. 6 is a diagram illustrating a relationship between the number of pedestrians and a vehicle stop threshold.

FIG. 6 is a diagram illustrating a relationship between the number of pedestrians and a vehicle stop threshold. The vertical axis of FIG. 6 represents a vehicle stop threshold [m], and the horizontal axis represents the number of pedestrians [persons]. The vehicle stop threshold is a threshold for determining whether the host vehicle M is automatically stopped on the basis of a relative distance between the host vehicle and a pedestrian.

For example, in a case where the number of pedestrians recognized by the pedestrian recognizer 132 is one, the deceleration driving controller 142 sets the vehicle stop threshold to a threshold St1. In addition, the deceleration driving controller 142 lowers the vehicle stop threshold every time the number of pedestrians recognized by the pedestrian recognizer 132 increases. Thereby, in a case where the number of pedestrians is large, it is possible to cause the host vehicle M to continue to travel.

Meanwhile, in a case where the number of pedestrians is equal to or greater than a predetermined number Nth1, the deceleration driving controller 142 may maintain a constant vehicle stop threshold Sth2. Thereby, the deceleration driving controller 142 can stop the host vehicle M without a relative distance from a pedestrian being too close.

[Function of Pedestrian Passage Driving Controller]

In a case where it is determined by the passage possibility determiner 134 that the vehicle cannot pass beside a pedestrian, the pedestrian passage driving controller 144 generates a target trajectory for passing beside the pedestrian. For example, the pedestrian passage driving controller 144 generates a target trajectory on the basis of information relating to a gap of the traveling route R1 recognized by the gap recognizer 136.

[Function of Gap Recognizer]

The gap recognizer 136 recognizes a region of a gap on a road on which the host vehicle M travels on the basis of the positions, movement speeds, and movement directions of a plurality of pedestrians recognized by the pedestrian recognizer 132.

Figure 7:
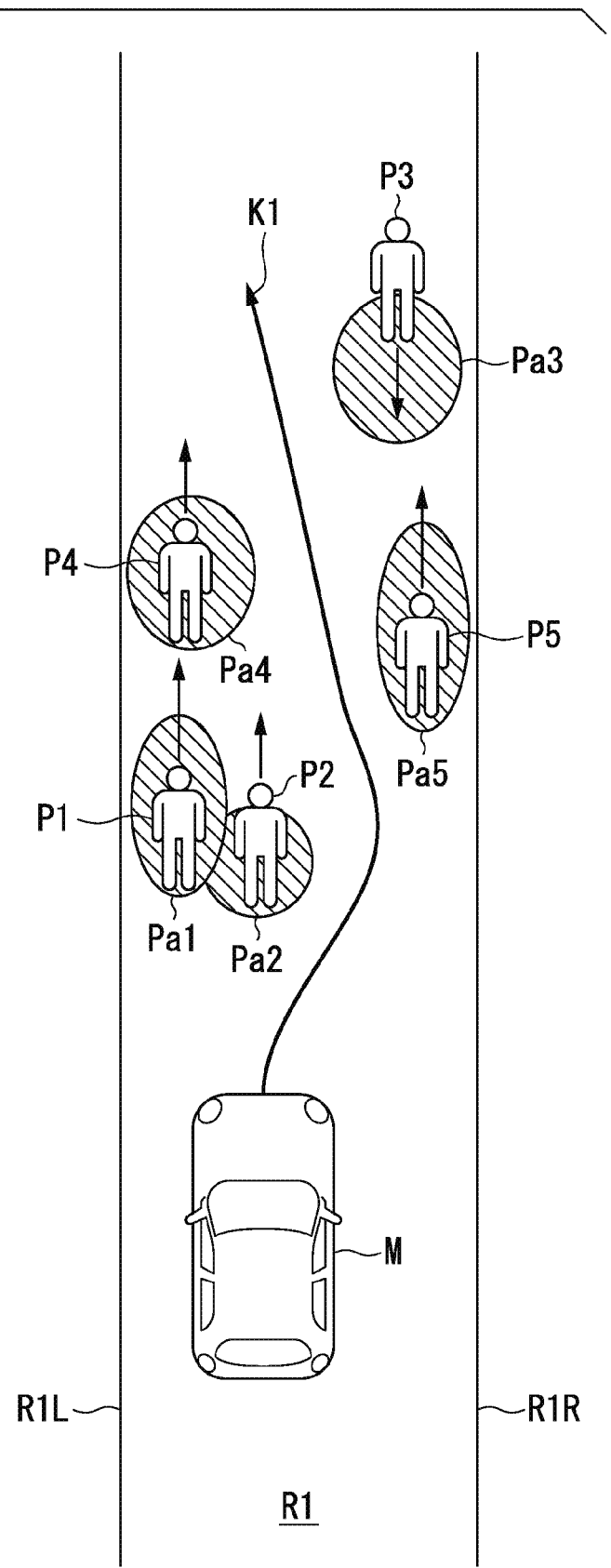
FIG. 7 is a diagram illustrating a region of a gap which is recognized by a gap recognizer 136.

FIG. 7 is a diagram illustrating a region of a gap which is recognized by the gap recognizer 136. In the example of FIG. 7, pedestrians P1 to P5 are assumed to be present on the traveling route R1. The pedestrian recognizer 132 recognizes the position, movement speed, and movement direction of each of the pedestrians P1 to P5.

The gap recognizer 136 sets each of target potential regions Pa1 to Pa5 on the basis of the position, movement speed, and movement direction of each of the pedestrians P1 to P5 recognized by the pedestrian recognizer 132. The term "target potential" is, for example, an index indicating the magnitude of possibility of coming into contact with an object (for example, a pedestrian). In addition, the target potential region is set to decrease with increasing distance from an object.

The gap recognizer 136 predicts the positions of the pedestrians P1 to P5 after a predetermined time on the basis of the positions, movement speeds, and movement directions of the pedestrians P1 to P5 recognized by the pedestrian recognizer 132, and sets the target potential regions Pa1 to Pa5 of the pedestrians on the basis of the predicted positions. The gap recognizer 136 recognizes a region which is not in contact with the target potential regions Pa1 to Pa5 as a gap region.

The pedestrian passage driving controller 144 generates a target trajectory K1 for passing beside the pedestrians P1 to P5 on the basis of the gap region recognized by the gap recognizer 136.

Meanwhile, the gap recognizer 136 may include a region which is in contact with some of the set target potential regions Pa1 to Pa5 but has a small amount of overlap as the gap region. Thereby, the pedestrian passage driving controller 144 slows the host vehicle M down along the target trajectory generated on the basis of the gap region, whereby the pedestrians P1 to P5 can notice and avoid the host vehicle M. As a result, the host vehicle M can pass beside the pedestrians P1 to P5.

[Function of Projection Controller]

In a case where the target trajectory is generated by the deceleration driving controller 142 or the pedestrian passage driving controller 144, the projection controller 180 projects an image indicating a future trajectory of the host vehicle M onto the traveling route of the host vehicle M.

Figure 8:
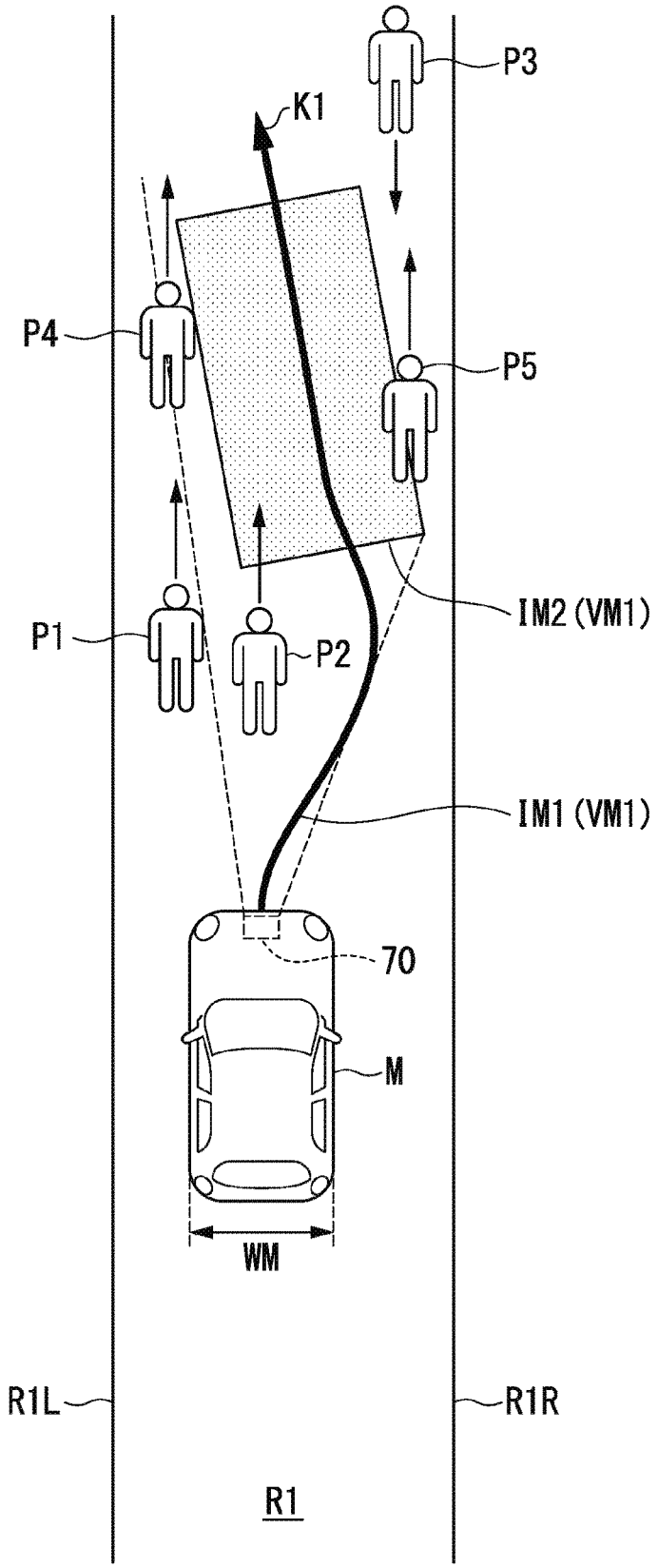
FIG. 8 is a diagram illustrating an image which is projected onto a traveling route by the projection controller 180.

FIG. 8 is a diagram illustrating an image which is projected onto a traveling route by the projection controller 180. In the example of FIG. 8, the projection controller 180 causes the projector 70 to project an image IM1 indicating the target trajectory K1 generated by the pedestrian passage driving controller 144 onto the traveling route R1. In addition, the projection controller 180 may project an image IM2 indicating a portion of a region in which the host vehicle M travels instead of (or, in addition to) projecting the image IM1 indicating the target trajectory itself onto the traveling route R1. In addition, the projection controller 180 may change the color or pattern of an image to be projected on the basis of a traveling situation such as the weather or a time slot.

In addition, the projection controller 180 may change the projection position or range of an image on the basis of the traveling speed of the host vehicle M. For example, the example of FIG. 8 shows the images IM1 and IM2 in a case where the traveling speed (VM1) of the host vehicle M is equal to or higher than a predetermined speed (for example, approximately 5 [km/h]). In this manner, in a case where the speed of the host vehicle M is equal to or higher than the predetermined speed, it is possible to allow many pedestrians present in front of the host vehicle to confirm a trajectory along which the host vehicle M will travel in the future by projecting an image in a wide range. Therefore, it is possible to allow many pedestrian to move to the roadside of the traveling route R1.

Figure 9:
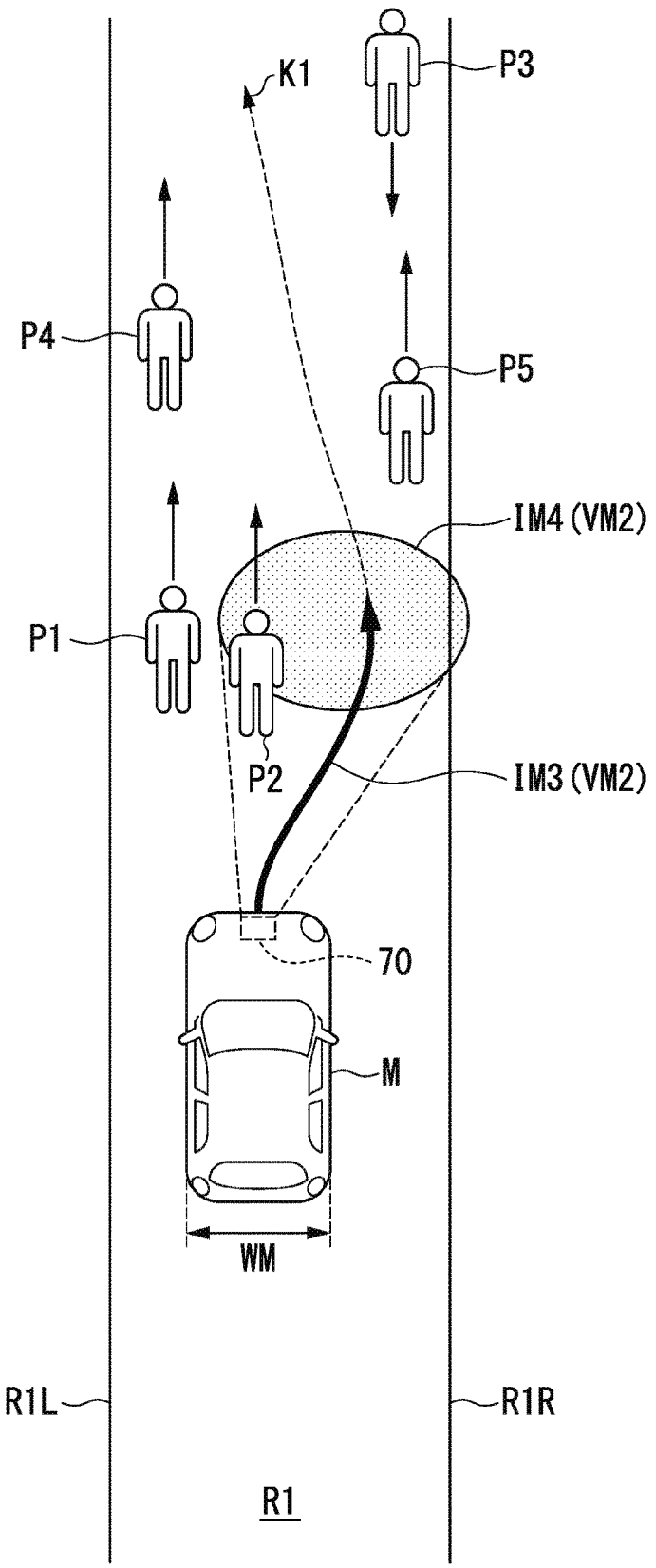
FIG. 9 is a diagram illustrating an image which is projected in a case where a traveling speed is lower than a predetermined speed.

FIG. 9 is a diagram illustrating an image which is projected in a case where the traveling speed is lower than a predetermined speed. In the example of FIG. 9, in a case where the host vehicle M is traveling at a speed VM2 which is lower in its traveling speed than the speed VM1, an image which is projected onto the road surface of the traveling route R1 is shown. The speed VM2 is lower than a predetermined speed.

In the example of FIG. 9, the projection controller 180 causes the projector 70 to project an image IM3 indicating a portion of the target trajectory K1 onto the traveling route R1. In addition, the projection controller 180 may cause the projector 70 to display an image IM4 indicating a portion of a region in which the host vehicle M travels on the traveling route R1, instead of (or, in addition to) the image IM3.

As shown in FIG. 9, in a case where the speed of the host vehicle M is low, a future trajectory of the host vehicle M is projected onto the vicinity of a point at which the pedestrians P1 and P2 walking near the host vehicle M are located, whereby the pedestrians P1 and P2 can notice the presence of the host vehicle M located in the rear and move to the roadside of the traveling route R1.

Modification Example

Here, a modification example of the present embodiment will be described. For example, in a case where the pedestrian recognizer 132 recognizes a specific pedestrian who leads a plurality of pedestrians among the recognized pedestrians, the deceleration driving controller 142 may predict future behaviors of the plurality of pedestrians on the basis of a specific pedestrian's behavior, and generate a target trajectory for stopping the host vehicle M on the basis of the predicted behaviors. The specific pedestrian is, for example, a tour conductor, a bus tour guide, or a teacher. In a case where the specific pedestrian is a tour conductor or a bus tour guide, leading target pedestrians are tour participants. In addition, in a case where the specific pedestrian is a teacher, leading target pedestrians are students.

Figure 10:
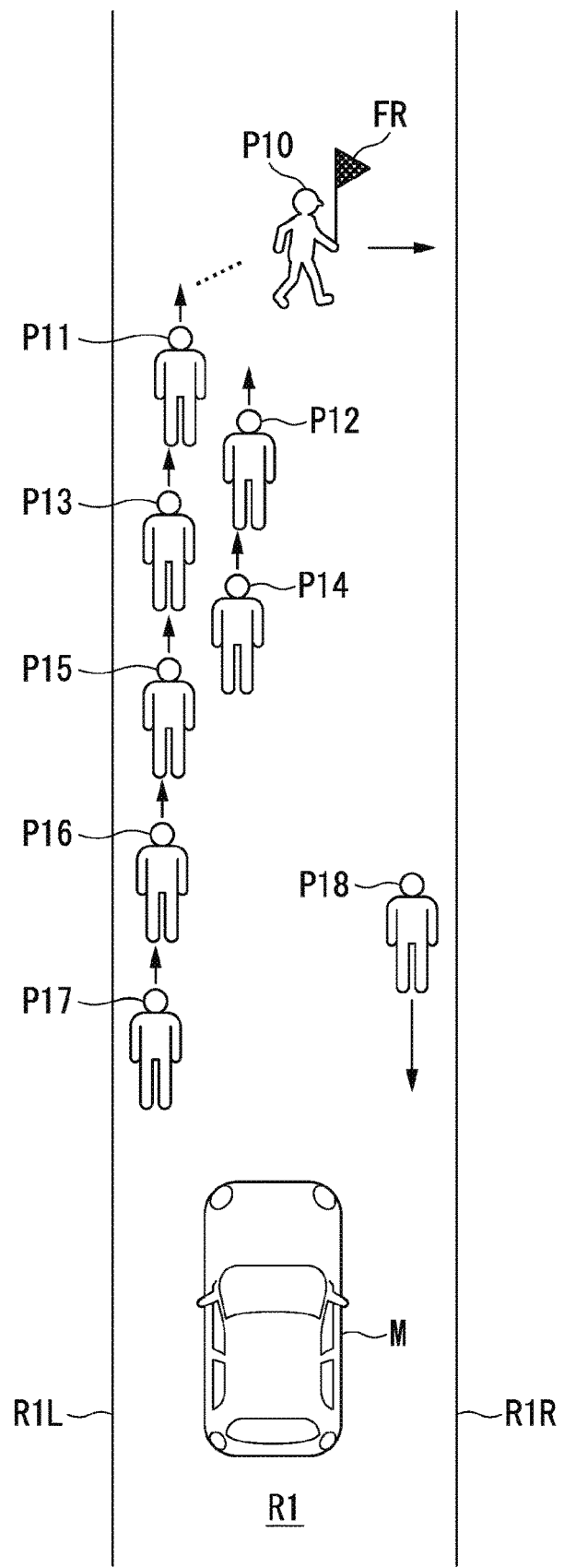
FIG. 10 is a diagram illustrating driving control of a host vehicle M in a case where a specific pedestrian is recognized.

FIG. 10 is a diagram illustrating driving control of the host vehicle M in a case where a specific pedestrian is recognized. The pedestrian recognizer 132 recognizes, for example, pedestrians who are located in front of the host vehicle M, and are present on the traveling route R1 on which the host vehicle M travels. In addition, the pedestrian recognizer 132 recognizes a specific pedestrian among the recognized pedestrians.

For example, the pedestrian recognizer 132 analyzes possessed objects that the recognized pedestrians possess, the clothes of the pedestrians, or the like through an image captured by the camera 10, and recognizes a pedestrian who possesses a predetermined possessed object or a pedestrian who wears predetermined clothes as a specific pedestrian. The possessed object is, for example, an object determined in advance which is assumed to be possessed by a leader such as a hand flag or a plate. In addition, the predetermined clothes are, for example, clothes determined in advance which are worn by a leader such as a tour conductor or a bus tour guide. The clothes include, for example, elements such as the shape or color of the clothes.

In the example of FIG. 10, the pedestrian recognizer 132 recognizes pedestrians P10 to P18. In addition, the pedestrian recognizer 132 recognizes possessed objects or clothes of the recognized pedestrians P10 to P18, and recognizes the pedestrian P10 who possesses a hand flag FR as a specific pedestrian.

In addition, the pedestrian recognizer 132 recognizes pedestrians who walk in the rear of the specific pedestrian P10 and satisfy the conditions that differences between the movement directions of the pedestrians and the movement direction of the specific pedestrian P10 are equal to or less than a predetermined angle (for example, approximately 90 [degrees]) and a distance from the specific pedestrian P10 is within a predetermined distance (for example, 15 [m]), among the pedestrians P11 to P18 excluding the specific pedestrian P10, as leading target pedestrians.

In the example of FIG. 10, the pedestrian recognizer 132 recognizes the pedestrians P11 to P17 as leading target pedestrians. In addition, the pedestrian recognizer 132 recognizes the behavior of the specific pedestrian P10, and predicts future behaviors of the leading target pedestrians P11 to P17 on the basis of the recognized behavior.

The deceleration driving controller 142 generates a target trajectory for executing deceleration driving of the host vehicle M on the basis of the behavior of the specific pedestrian P10 recognized by the pedestrian recognizer 132 and the prediction results of the future behaviors of the leading target pedestrians P11 to P17.

In the example of FIG. 10, in a case where the pedestrian recognizer 132 recognizes that the specific pedestrian P10 is moving from the vicinity of the left roadside R1L of the traveling route R1 to the right roadside R1R, the leading target pedestrians P11 to P17 are also predicted to move to the right roadside R1R. The deceleration driving controller 142 generates a target trajectory for stopping the host vehicle M until all the leading target pedestrians P11 to P17 move to the right roadside R1R on the basis of the recognition result of the pedestrian recognizer 132. In this manner, the determination of stop control of the host vehicle M is facilitated by predicting the behaviors of the leading target pedestrians P11 to P17 on the basis of the behavior of the specific pedestrian P10. In addition, the leading target pedestrians P11 to P17 have a tendency to traverse the traveling route R1 because the host vehicle M stops before traversing the traveling route. As a result, the host vehicle M can pass beside the pedestrians rapidly.

[Process Flow]

Figure 11:
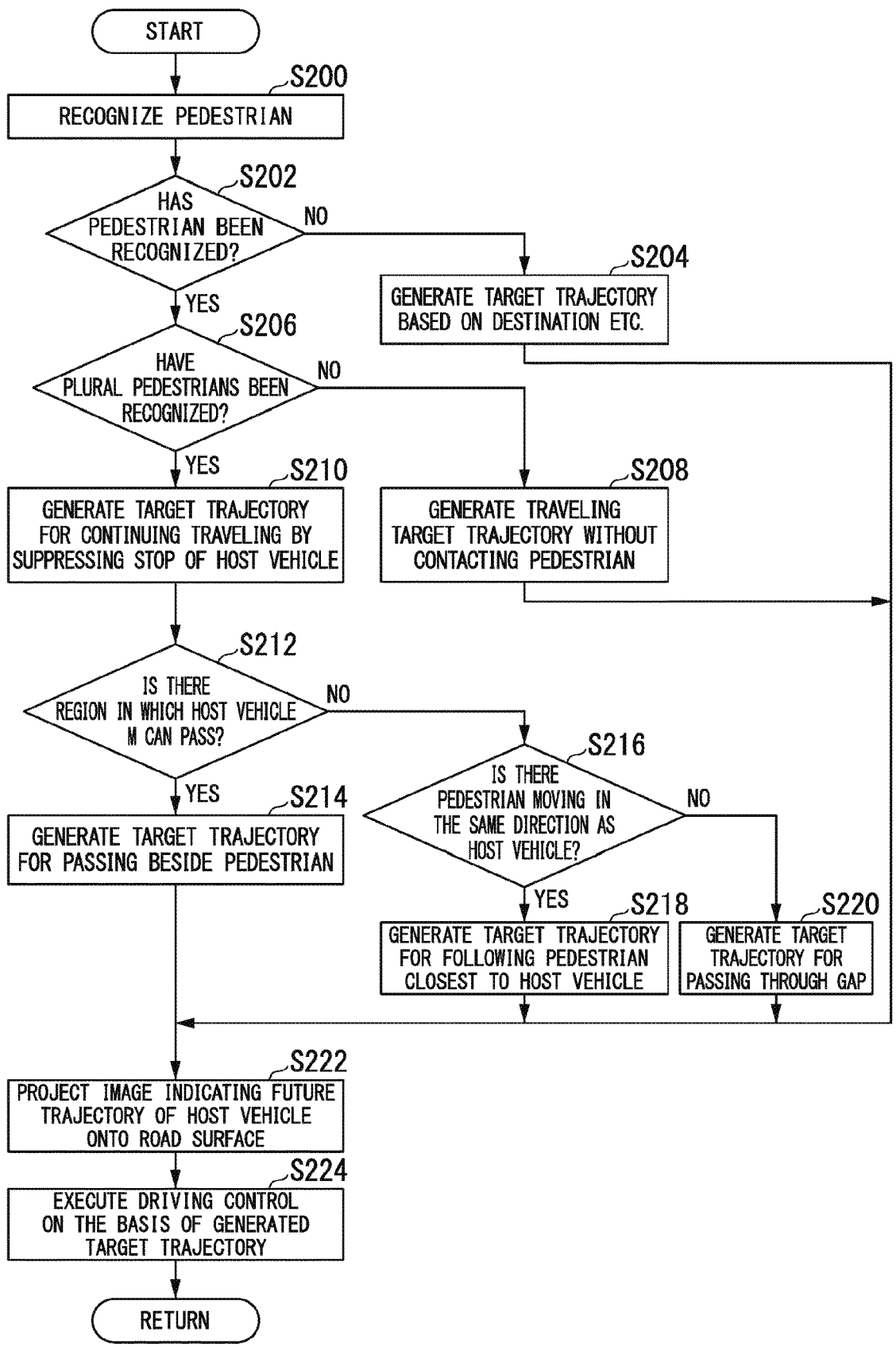
FIG. 11 is a flow chart illustrating an example of processing which is executed by an automated driving controller 100 according to the embodiment.

FIG. 11 is a flow chart illustrating an example of processing which is executed by the automated driving controller 100 according to the embodiment. The processing of the present flow chart may be repeatedly executed, for example, in a predetermined period or at a predetermined timing during the execution of automated driving of the host vehicle M.

First, the pedestrian recognizer 132 recognizes a pedestrian who is located in front of the host vehicle M and is present on the traveling route R1 on which the host vehicle M travels (step S200). Next, the pedestrian recognizer 132 determines whether a pedestrian has been recognized (step S202). In a case where a pedestrian has not been recognized, the behavior plan generator 140 generates a target trajectory of the host vehicle M on the basis of information on a route to a destination or the like (step S204).

In addition, in a case where a pedestrian has been recognized, the pedestrian recognizer 132 determines whether a plurality of pedestrians have been recognized (step S206). In a case where it is determined that a plurality of pedestrians are not recognized, the deceleration driving controller 142 generates a target trajectory for traveling without coming into contact with the pedestrians (step S208). In addition, in a case where it is determined that a plurality of pedestrians have been recognized, the deceleration driving controller 142 generates a target trajectory for the host vehicle M to continue to travel by suppressing stop of the host vehicle rather than driving control based on the process of step S204 or driving control based on the process of step S208 (step S210).

Next, it is determined whether there is a region in which the host vehicle M can pass beside a pedestrian (step S212). In a case where it is determined that there is a region in which the host vehicle M can pass beside a pedestrian, the pedestrian passage driving controller 144 generates a target trajectory for the host vehicle to pass beside a pedestrian (step S214).

In addition, in a case where it is determined that there is not a region in which the host vehicle M can pass beside a pedestrian, the pedestrian passage driving controller 144 determines whether there is a pedestrian who moves in the same direction as the host vehicle M (step S216). In a case where it is determined that there is a pedestrian who moves in the same direction as the host vehicle M, the deceleration driving controller 142 generates a target trajectory for the host vehicle M to follow a pedestrian closest to the host vehicle (step S218). In addition, in a case where it is determined that there is not a pedestrian who moves in the same direction as the host vehicle M, the pedestrian passage driving controller 144 generates a target trajectory for the host vehicle M to pass through a gap (step S220).

Next, the projection controller 180 projects, for example, an image indicating a future trajectory of the host vehicle M onto a road surface on which the host vehicle M travels on the basis of the target trajectory generated by the process of step S208, S210, S214, S218, or S220 (step S222). Next, the second controller 160 controls at least deceleration of the host vehicle M on the basis of the generated target trajectory, and executes driving control for causing the host vehicle M to travel (step S224). Thereby, the processing of the present flow chart is terminated.

According to the above-described embodiment, a pedestrian present in the periphery of the host vehicle M is recognized, and driving control for decelerating at least the host vehicle M irrespective of an occupant's operation of the host vehicle M in accordance with the host vehicle M and a pedestrian approaching each other and delaying a timing at which the host vehicle M is stopped in a case where a plurality of recognized pedestrians are present on a traveling route of the host vehicle is performed, whereby it is possible to perform driving control for causing the vehicle to continue to travel on the basis of the states of pedestrians present on the traveling route.

For example, in a case where a large number of pedestrians are present on the traveling route, the situation is not improved immediately even when the host vehicle M is stopped, and it takes time to wait for pedestrians to pass by. For this reason, in the present embodiment, the host vehicle M is slowed down in concert with pedestrians and caused to continue to travel, whereby it is possible to pass on the traveling route rapidly.

[Hardware Configuration]

Figure 12:
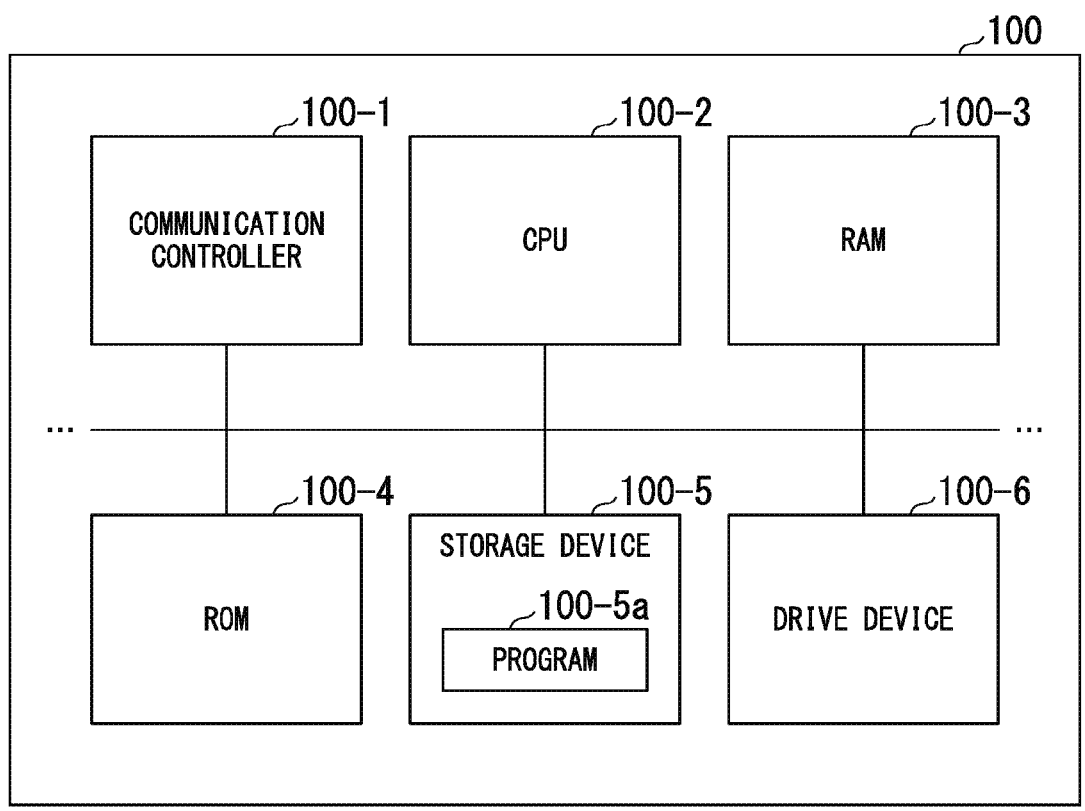
FIG. 12 is a diagram illustrating an example of a hardware configuration of the automated driving controller 100 according to the embodiment.

The automated driving controller 100 of the above-described embodiment is realized by, for example, the configuration of hardware as shown in FIG. 12. FIG. 12 is a diagram illustrating an example of a hardware configuration of the automated driving controller 100 according to the embodiment.

The automated driving controller 100 is configured such that a communication controller 100-1, a CPU 100-2, a RAM 100-3, a ROM 100-4, a secondary storage device 100-5 such as a flash memory or an HDD, and a drive device 100-6 are connected to each other through an internal bus or a dedicated communication line. The drive device 100-6 has a portable storage medium such as an optical disc mounted therein. A program 100-5a stored in the secondary storage device 100-5 is developed into the RAM 100-3 by a DMA controller (not shown) or the like and is executed by the CPU 100-2, whereby the first controller 120 and the second controller 160 are realized. The program which is referred to by the CPU 100-2 may be stored in a portable storage medium mounted in the drive device 100-6, or may be downloaded from other devices through the network NW.

The above embodiment can be represented as follows.

A vehicle control device including:

a storage device having information stored therein and a hardware processor that executes a program stored in the storage device, wherein the hardware processor executes the program to thereby execute a pedestrian recognition process of recognizing a pedestrian present in the periphery of a vehicle and a driving control process of decelerating the vehicle irrespective of an occupant's operation of the vehicle in accordance with the vehicle and pedestrian approaching each other, and delaying a timing at which the vehicle is stopped in a case where a plurality of pedestrians recognized through the pedestrian recognition process are present on a traveling route of the vehicle.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

REFERENCE SIGNS LIST

1 Vehicle system
10 Camera
12 Radar device
14 Viewfinder
16 Object recognition device
20 Communication device
30 HMI
32 Automated driving start switch
40 Vehicle sensor
50 Navigation device
60 MPU
70 Projector
80 Driving operator
100 Automated driving controller
120 First controller
130 Recognizer
132 Pedestrian recognizer
134 Passage possibility determiner
136 Gap recognizer
140 Behavior plan generator
142 Deceleration driving controller
144 Pedestrian passage driving controller
160 Second controller
180 Projection controller
200 Traveling drive force output device
210 Brake device
220 Steering device
M Host vehicle

The invention claimed is:

1. A vehicle control device comprising:
a processor that executes instructions to:
recognize a pedestrian present in the periphery of a vehicle;
decelerate at least the vehicle irrespective of an occupant's operation of the vehicle in accordance with the vehicle and a pedestrian approaching each other, and delays a timing at which the vehicle is stopped in a case where a plurality of pedestrians recognized are present on a traveling route of the vehicle; and
cause a projector that projects an image on the road to project an image indicating a future trajectory of the vehicle, in a case where a plurality of pedestrians recognized are present on the traveling route of the vehicle.

2. The vehicle control device according to claim 1, wherein the processor changes a range in which the image is projected by the projector on the basis of a speed of the vehicle.

3. The vehicle control device according to claim 1, wherein, in a case where a plurality of pedestrians recognized processor are present, the processor delays a timing at which the vehicle is stopped by narrowing a range in which the pedestrians are specified as control targets.

4. The vehicle control device according to claim 1, wherein the processor delays a timing at which the vehicle is stopped by lowering a threshold at which the vehicle is stopped.

5. The vehicle control device according to claim 1, wherein the processor further executes instructions to:
recognize a position of a gap, having a possibility of the vehicle and the occupant coming into contact with each other on a road on which the vehicle travels, from positions of a plurality of pedestrians recognized,
wherein the processor generates a future target trajectory along which the vehicle will travel on the basis of a region of the gap recognized, and the vehicle travels so that the pedestrians take notice of passage of the vehicle by slowing down along the generated target trajectory.

6. The vehicle control device according to claim 1, wherein the processor recognizes a specific pedestrian who leads the recognized plurality of pedestrians, and
the processor performs deceleration control on the vehicle on the basis of the specific pedestrian's behavior.

7. A vehicle control device comprising:
a processor that executes instructions to:
recognize a pedestrian present in the periphery of a vehicle; and
decelerate at least the vehicle irrespective of an occupant's operation of the vehicle in accordance with the vehicle and a pedestrian approaching each other, and delays a timing at which the vehicle is stopped in a case where a plurality of pedestrians recognized are present on a traveling route of the vehicle,
wherein, in a case where a plurality of pedestrians recognized are present, the processor delays a timing at which the vehicle is stopped by narrowing a range in which the pedestrians are specified as control targets.

8. A vehicle control device comprising:
a processor that executes instructions to:
recognize a pedestrian present in the periphery of a vehicle;
decelerate at least the vehicle irrespective of an occupant's operation of the vehicle in accordance with the vehicle and a pedestrian approaching each other, and delays a timing at which the vehicle is stopped in a case where a plurality of pedestrians recognized are present on a traveling route of the vehicle; and
recognize a position of a gap, having a possibility of the vehicle and the occupant coming into contact with each other on a road on which the vehicle travels, from positions of a plurality of pedestrians recognized,
wherein the processor generates a future target trajectory along which the vehicle will travel on the basis of a region of the gap recognized, and the vehicle travels so that the pedestrians take notice of passage of the vehicle by slowing down along the generated target trajectory.

9. A vehicle control device comprising:
a processor that executes instructions to:
recognize a pedestrian present in the periphery of a vehicle; and
decelerate at least the vehicle irrespective of an occupant's operation of the vehicle in accordance with the vehicle and a pedestrian approaching each other, and delays a timing at which the vehicle is stopped in a case where a plurality of pedestrians recognized are present on a traveling route of the vehicle,
wherein the processor recognizes a specific pedestrian who leads the recognized plurality of pedestrians, and
the processor performs deceleration control on the vehicle on the basis of the specific pedestrian's behavior.

10. A vehicle control method comprising causing an in-vehicle computer to:
recognize a pedestrian present in the periphery of a vehicle;

decelerate at least the vehicle irrespective of an occupant's operation of the vehicle in accordance with the vehicle and a pedestrian approaching each other, and delays a timing at which the vehicle is stopped in a case where a plurality of pedestrians recognized are present on a traveling route of the vehicle; and cause a projector that projects an image on the road to project an image indicating a future trajectory of the vehicle, in a case where a plurality of pedestrians recognized are present on the traveling route of the vehicle.

11. A vehicle control method comprising causing an in-vehicle computer to:

recognize a pedestrian present in the periphery of a vehicle; and decelerate at least the vehicle irrespective of an occupant's operation of the vehicle in accordance with the vehicle and a pedestrian approaching each other, and delays a timing at which the vehicle is stopped in a case where a plurality of pedestrians recognized are present on a traveling route of the vehicle, wherein, in a case where a plurality of pedestrians recognized are present, the processor delays a timing at which the vehicle is stopped by narrowing a range in which the pedestrians are specified as control targets.

12. A vehicle control method comprising causing an in-vehicle computer to:

recognize a pedestrian present in the periphery of a vehicle;

decelerate at least the vehicle irrespective of an occupant's operation of the vehicle in accordance with the vehicle and a pedestrian approaching each other, and delays a timing at which the vehicle is stopped in a case where a plurality of pedestrians recognized are present on a traveling route of the vehicle; and recognize a position of a gap, having a possibility of the vehicle and the occupant coming into contact with each other on a road on which the vehicle travels, from positions of a plurality of pedestrians recognized, wherein the processor generates a future target trajectory along which the vehicle will travel on the basis of a region of the gap recognized, and the vehicle travels so that the pedestrians take notice of passage of the vehicle by slowing down along the generated target trajectory.

13. A vehicle control method comprising causing an in-vehicle computer to:

recognize a pedestrian present in the periphery of a vehicle; and decelerate at least the vehicle irrespective of an occupant's operation of the vehicle in accordance with the vehicle and a pedestrian approaching each other, and delays a timing at which the vehicle is stopped in a case where a plurality of pedestrians recognized are present on a traveling route of the vehicle, wherein the processor recognizes a specific pedestrian who leads the recognized plurality of pedestrians, and the processor performs deceleration control on the vehicle on the basis of the specific pedestrian's behavior.

14. A non-transitory computer-readable storage medium storing a program that causes an in-vehicle computer to:

recognize a pedestrian present in the periphery of a vehicle;

decelerate at least the vehicle irrespective of an occupant's operation of the vehicle in accordance with the vehicle and a pedestrian approaching each other, and delays a timing at which the vehicle is stopped in a case where a plurality of pedestrians recognized are present on a traveling route of the vehicle; and cause a projector that projects an image on the road to project an image indicating a future trajectory of the vehicle, in a case where a plurality of pedestrians recognized are present on the traveling route of the vehicle.

15. A non-transitory computer-readable storage medium storing a program that causes an in-vehicle computer to:

recognize a pedestrian present in the periphery of a vehicle; and decelerate at least the vehicle irrespective of an occupant's operation of the vehicle in accordance with the vehicle and a pedestrian approaching each other, and delays a timing at which the vehicle is stopped in a case where a plurality of pedestrians recognized are present on a traveling route of the vehicle, wherein, in a case where a plurality of pedestrians recognized are present, the processor delays a timing at which the vehicle is stopped by narrowing a range in which the pedestrians are specified as control targets.

16. A non-transitory computer-readable storage medium storing a program that causes an in-vehicle computer to:

recognize a pedestrian present in the periphery of a vehicle;

decelerate at least the vehicle irrespective of an occupant's operation of the vehicle in accordance with the vehicle and a pedestrian approaching each other, and delays a timing at which the vehicle is stopped in a case where a plurality of pedestrians recognized are present on a traveling route of the vehicle; and recognize a position of a gap, having a possibility of the vehicle and the occupant coming into contact with each other on a road on which the vehicle travels, from positions of a plurality of pedestrians recognized, wherein the processor generates a future target trajectory along which the vehicle will travel on the basis of a region of the gap recognized, and the vehicle travels so that the pedestrians take notice of passage of the vehicle by slowing down along the generated target trajectory.

17. A non-transitory computer-readable storage medium storing a program that causes an in-vehicle computer to:

recognize a pedestrian present in the periphery of a vehicle; and decelerate at least the vehicle irrespective of an occupant's operation of the vehicle in accordance with the vehicle and a pedestrian approaching each other, and delays a timing at which the vehicle is stopped in a case where a plurality of pedestrians recognized are present on a traveling route of the vehicle, wherein the processor recognizes a specific pedestrian who leads the recognized plurality of pedestrians, and the processor performs deceleration control on the vehicle on the basis of the specific pedestrian's behavior.

* * * * *